United States Patent
Yang et al.

(10) Patent No.: US 6,985,354 B2
(45) Date of Patent: Jan. 10, 2006

(54) PORTABLE COMPUTER MOUNTED WITH WIRELESS LAN CARD

(75) Inventors: Chee-hwan Yang, Suwon (KR); Jeong-karb Shin, Hwasung-kun (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 559 days.

(21) Appl. No.: 10/159,130

(22) Filed: Jun. 3, 2002

(65) Prior Publication Data

US 2003/0099088 A1 May 29, 2003

(30) Foreign Application Priority Data

Nov. 23, 2001 (KR) .................................... 2001-73276
Feb. 7, 2002 (KR) .................................... 2002-7140

(51) Int. Cl.
*G06F 1/16* (2006.01)

(52) U.S. Cl. ................ 361/683; 361/684; 343/906; 455/89; 455/269; 710/62; 710/303

(58) Field of Classification Search ......... 361/683–686; 343/702, 906; 312/223.1; 349/58–60; 710/62, 710/303; 455/89, 90, 269, 280
See application file for complete search history.

(56) References Cited

U.S. PATENT DOCUMENTS

| | | | | | |
|---|---|---|---|---|---|
| 5,440,449 A | * | 8/1995 | Scheer | ................ | 361/686 |
| 5,606,732 A | * | 2/1997 | Vignone, Sr. | ................ | 455/269 |
| 5,608,606 A | * | 3/1997 | Blaney | ................ | 361/686 |
| 6,115,762 A | * | 9/2000 | Bell et al. | ................ | 710/62 |
| 6,222,726 B1 | * | 4/2001 | Cha | ................ | 361/683 |
| 6,525,932 B1 | * | 2/2003 | Ohnishi et al. | ................ | 361/686 |
| 6,532,152 B1 | * | 3/2003 | White et al. | ................ | 361/683 |
| 6,545,643 B1 | * | 4/2003 | Sward et al. | ................ | 343/702 |
| 6,577,500 B2 | * | 6/2003 | Paredes et al. | ................ | 361/686 |
| 6,717,801 B1 | * | 4/2004 | Castell et al. | ................ | 361/683 |

FOREIGN PATENT DOCUMENTS

| | | |
|---|---|---|
| JP | 05-20272 | 1/1993 |
| JP | 8-101900 | 4/1996 |
| JP | 8-267971 | 10/1996 |
| JP | 10-512700 | 12/1998 |
| JP | 2000-306621 | 11/2000 |

* cited by examiner

*Primary Examiner*—Lisa Lea-Edmonds
(74) *Attorney, Agent, or Firm*—Stass & Halsey LLP

(57) ABSTRACT

A portable computer having a main board; an antenna receiving and transmitting an RF signal; a PCI slot part provided in the main board and receiving the RF signal received and transmitted through the antenna; a wireless LAN card including a main card removably inserted into the PCI slot part, and an RF connector provided at a side of the main card and through which the RF signal is inputted/outputted between the antenna and the PCI slot part; and an antenna connecting part connected to the RF connector and allowing the RF signal to be inputted/outputted through the RF connector between the antenna and the PCI slot part when the wireless LAN card is inserted into the PCI slot part. With this configuration, the present invention provides a portable computer improved in a mounting structure of a wireless LAN card doing not have an antenna.

10 Claims, 5 Drawing Sheets

PORTABLE COMPUTER MOUNTED WITH WIRELESS LAN CARD

CROSS-REFERENCE TO RELATED APPLICATIONS

This application claims the benefit of Korean Patent Application No. 2001-73276 filed on Nov. 23, 2001, and Korean Patent Application No. 2002-7140 filed on Feb. 7, 2002 in the Korean Industrial Property Office, the disclosures of which are incorporated herein by reference.

BACKGROUND OF THE INVENTION

1. Field of the Invention

The present invention relates in general to a portable computer having a wireless LAN card mounted thereto, and more particularly, to a portable computer having an improved mounting structure to mount a wireless LAN card.

2. Description of the Related Art

A LAN (local area network) card is employed to allow a computer to access a network. According to a development of high-speed data communication and the widespread Internet, recent computers are generally mounted with the LAN card. Further, as an example of the LAN card, there is a wireless LAN card to allow wireless data communication.

The wireless LAN card enables wireless data communication between computers using an infrared signal or a high frequency signal, thereby facilitating installation and replacement of the wireless LAN card. The wireless LAN card can be mounted on a portable computer, a desktop computer, etc. However, the wireless LAN card is particularly useful on the portable computer because the portable computer provides mobility.

Because the design of the portable computer is restricted in size and shape in direct relation to its mobility, it is inconvenient to mount a standard PCI (peripheral component interconnect) LAN card on the portable computer. Therefore, a mini PCI LAN card that is smaller than the standard PCI LAN card is mostly employed in the portable computer. However, the mini PCI LAN card is too small to incorporate an antenna. Therefore, the mini PCI wireless LAN card is employed in the portable computer with a separate connectable antenna.

Hereinbelow, the mounting state of the mini PCI wireless LAN card will be described while referring to FIGS. 3 and 4.

FIG. 3 is an exploded perspective view of a portable computer, and FIG. 4 illustrates where a mini PCI wireless LAN card is mounted from the bottom view of the portable computer of FIG. 3. As illustrated in FIG. 3, the portable computer comprises a main body 110, and a display panel 100 rotatably connected to the main body 110. The main body 110 comprises an upper casing 112 and a lower casing 116, which are combined to each other to form a predetermined housing space. On the upper surface of the upper casing 112 is provided an input unit such as a keyboard 111, a touch pad, etc.

In the housing space created by the upper and lower casings 112 and 116 is installed a main board 114 mounted with a system circuit such as a CPU (central processing unit), a BIOS (basic input/output system) memory, etc. On the rear of the main board 114 is provided a PCI slot part 200 (see FIG. 4) to be described later, so as to allow a PCI card type peripheral unit to be mounted on the main board 114. Further, inside the edge of the housing space are provided antenna parts 118. Each antenna part 118 comprises an antenna 120 to receive and transmit an RF (radio frequency) signal, and an RF signal line 122 through which the RF signal is delivered.

As illustrated in FIG. 4, in the PCI slot part 200, provided on the rear of the main board 114, a wireless LAN card 210 of a PCI card type can be inserted. The wireless LAN card 210 is slidingly inserted into the PCI slot part 200, and then the wireless LAN card 210 is connected to the antenna parts 118 by connecting RF connectors 218 of the wireless LAN card 210 with the RF signal lines 122 of the antenna parts 118, thereby completing the installation of the wireless LAN card 210.

The mounting state of the conventional wireless LAN card 210 is schematically illustrated in FIG. 5. As illustrated in FIG. 5, in the PCI slot part 200 mounted on the main board 114 are provided a pair of latch members 202 protruding from the PCI slot part 200 and spaced from each other by a predetermined distance.

The wireless LAN card 210 comprises a main card 212 made of a PCB (printed circuit board) substrate including a signal processing circuit. In the front of the main card 212 is provided a connector 216 inserted in the PCI slot part 200 and in the rear of the main card 212 is provided the RF connectors 218 to which the RF signal lines 122 of the antenna parts 118 are connected. Further, both sides of the main card 212 are provided with latch grooves 214 on which the latch members 202 of the PCI slot part 200 are latched.

With this configuration, when the connector 216 of the wireless LAN card 210 is completely inserted into the PCI slot part 200 of the main board 114, the latch members 202 of the PCI slot part 200 are latched onto the latch grooves 214 formed on the wireless LAN card 210, thereby preventing the wireless LAN card 210 from being separated from the PCI slot part 200. Then, the RF signal lines 122 of the antenna parts 118 are connected to the RF connectors 218 of the wireless LAN card 210, thereby allowing an RF signal received and transmitted through the antenna parts 118 to be inputted to and outputted from the wireless LAN card 210.

As described above, in order to install a wireless LAN card, the RF signal lines of the antenna parts must be separately connected to the RF connectors of the wireless LAN card when the wireless LAN card is inserted into a PCI slot part. Therefore it is inconvenient for a user to install the wireless LAN card, while the production process thereof is complicated.

SUMMARY OF THE INVENTION

Accordingly, it is an object of the present invention to provide a portable computer with an improved mounting structure of a wireless LAN card not having an antenna to be attached thereto.

Additional objects and advantages of the invention will be set forth in part in the description which follows and, in part, will be obvious from the description, or may be learned by practice of the invention.

The foregoing and other objects of the present invention may be accomplished by providing a portable computer comprising a main board; an antenna to receive and transmit an RF signal; a PCI slot part provided in the main board to receive the RF signal received and transmitted through the antenna; a wireless LAN card including a main card removably inserted into the PCI slot part, and an RF connector provided at the sides of the main card and through which RF signal is inputted/outputted between the antenna and the PCI slot part; and an antenna connecting part connected to the RF connector and allowing the RF signal to be inputted/ outputted through the RF connector between the antenna and the PCI slot part when the wireless LAN card is inserted into the PCI slot part.

The portable computer further comprises a pair of latch members provided at opposite sides of the PCI slot part to guide the wireless LAN card to be slidingly inserted into the PCI slot part, and to be connected to the antenna connecting parts; and a pair of RF signal lines embedded inside the antenna connecting parts and the latch members, and connecting the antenna connecting parts to the RF connectors of the wireless LAN card.

Additionally, on each antenna connecting part and each latch member are provided protruding parts to be latched onto the wireless LAN card, respectively, and in the wireless LAN card are provided latch grooves corresponding to the protruding parts.

Further, the RF signal line is exposed externally at the protruding part of the antenna connecting part, and electrically connected to the RF connector.

The present invention also provides that the wireless LAN card includes ground parts positioned at opposite sides of the main card, and the antenna connecting parts and the latch members include protruding parts to be connected to the ground parts.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
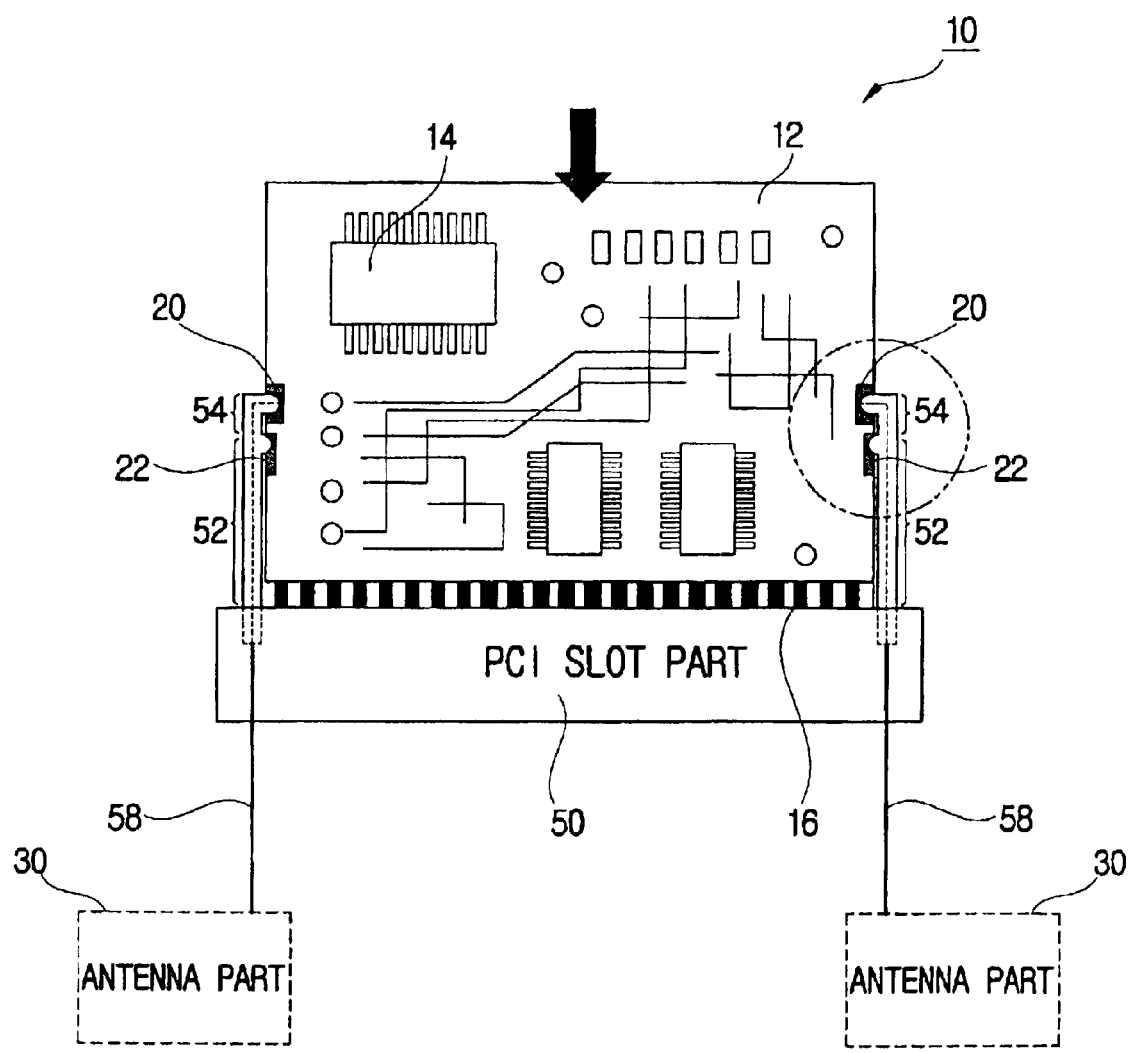
FIG. 1 illustrates a portable computer according to the present invention having a wireless LAN card mounted thereto.

Reference will now be made in detail to the embodiments of the present invention, examples of which are illustrated in the accompanying drawings, wherein like reference numerals refer to the like elements throughout. The embodiments are described below in order to explain the present invention by referring to the figures.

As illustrated in FIG. 1, a portable computer according to the present invention comprises a pair of antenna parts 30 for wireless communication, a PCI slot part 50 connected to the antenna parts 30, a pair of latch members 52 protruding from opposite sides of the PCI slot part 50 and preventing a wireless LAN card from breaking away (or being separated) from the PCI slot part 50, and antenna connecting parts 54 extended from free ends of the latch members 52 and electrically connecting the antenna parts 30 with the wireless LAN card 10.

The antenna parts 30 receive and transmit an RF signal for the Internet, mobile communication, etc. Herein, a pole type antenna or a card type antenna printed on the PCB may be employed as the antenna parts 30. Connected to each antenna part 30 is an RF signal line 58 to communicate a signal to specific circuits within the LAN card 10.

Figure 3:
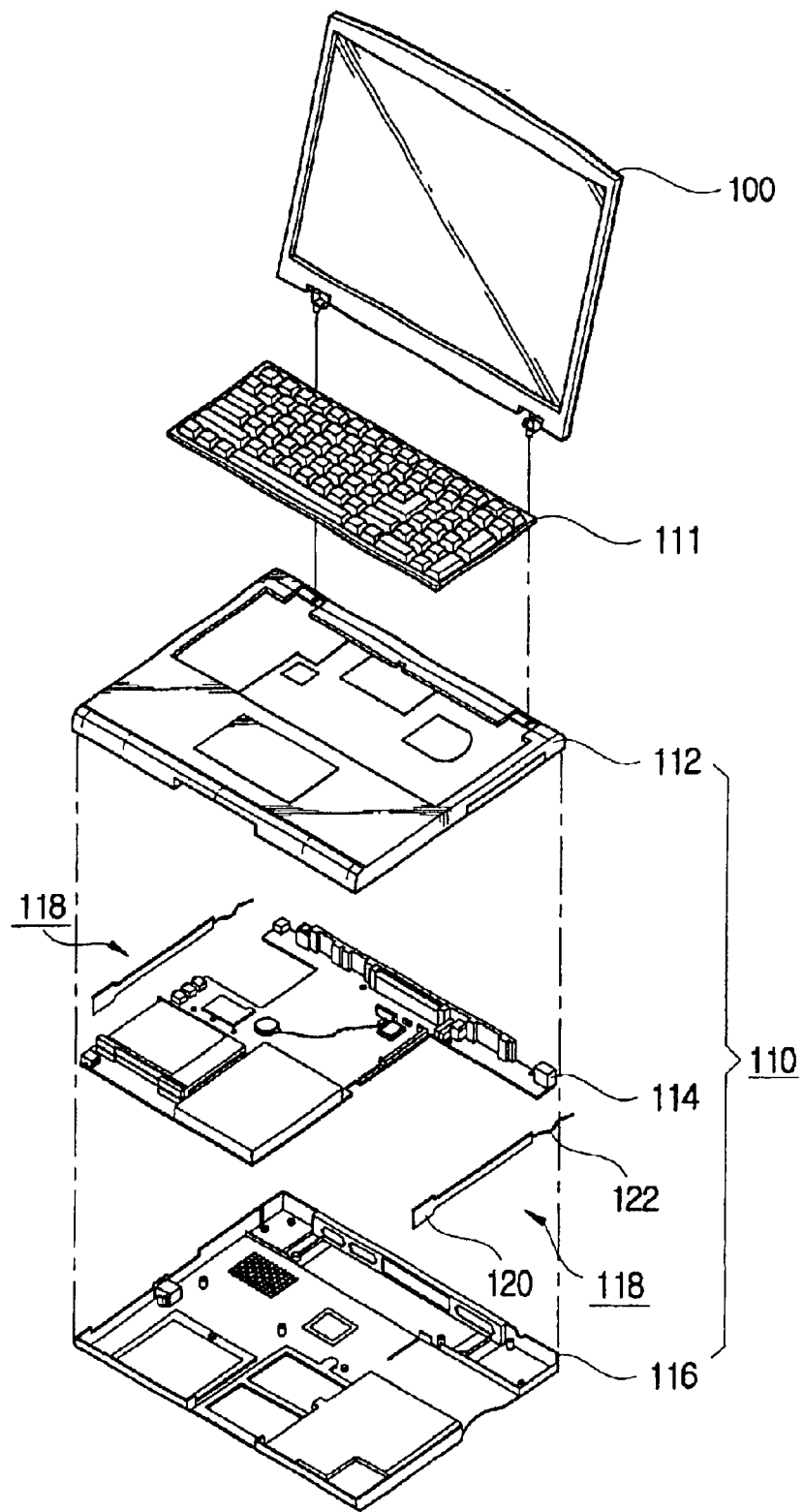
FIG. 3 is an exploded perspective view of a portable computer.
Figure 4:
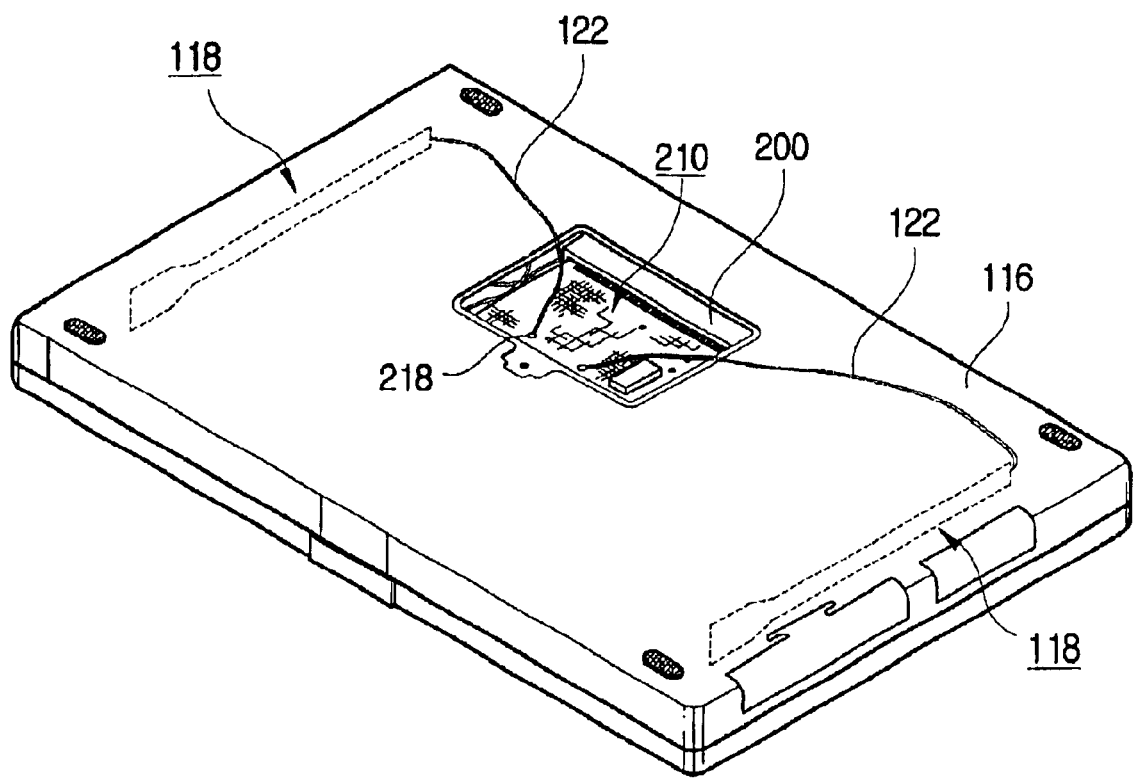
FIG. 4 illustrates where the wireless LAN card is mounted on the bottoms of the portable computer of FIG. 3.
Figure 5:
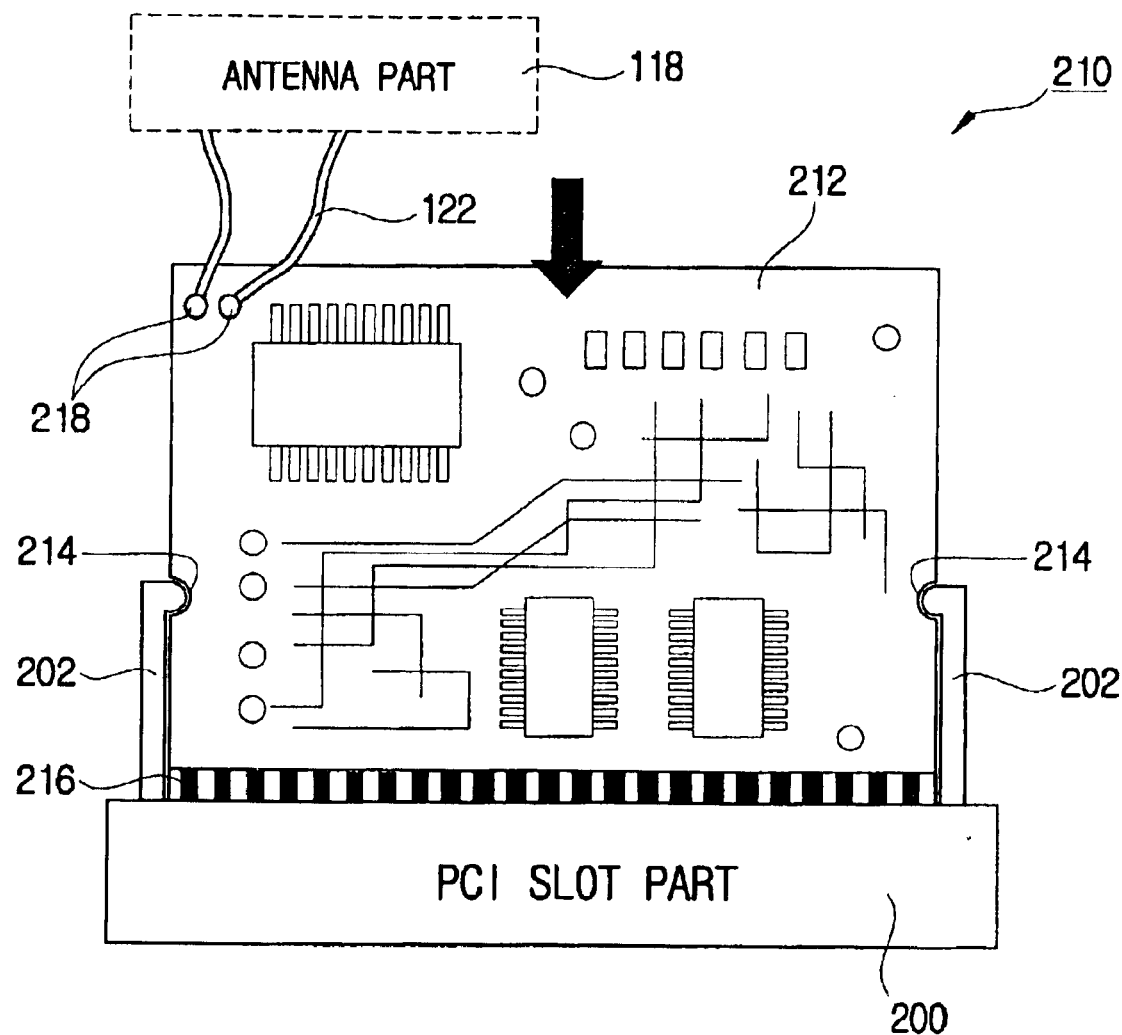
FIG. 5 schematically illustrates a conventional portable computer mounted with the wireless LAN card.

The PCI slot part 50, provided in a main board 114 (see FIG. 3), is electrically connected to the RF signal lines 58 of the antenna parts 30. Thus, the RF signal received through the antenna parts 30 is transmitted to the PCI slot part 50 via the RF signal lines 58. The RF signal lines 58 can be connected to the PCI slot part 50 by soldering or by providing an RF connector within the PCI slot part 50 (not shown), or by other methods known in the art. When providing the RF connector within the PCI slot part 50, the RF signal line 58 is connected to the RF connector provided in the PCI slot part 50.

At opposite sides of the PCI slot part 50 are provided the pair of latch members 52 protruding therefrom, as described above. The latch members 52 guide the wireless LAN card 10 to be slidingly inserted into the PCI slot part 50, and prevent the wireless LAN card 10 from being separated from the PCI slot part 50. At the free end of each latch member 52 is provided the antenna connecting part 54 protruding inwardly.

Figure 2:
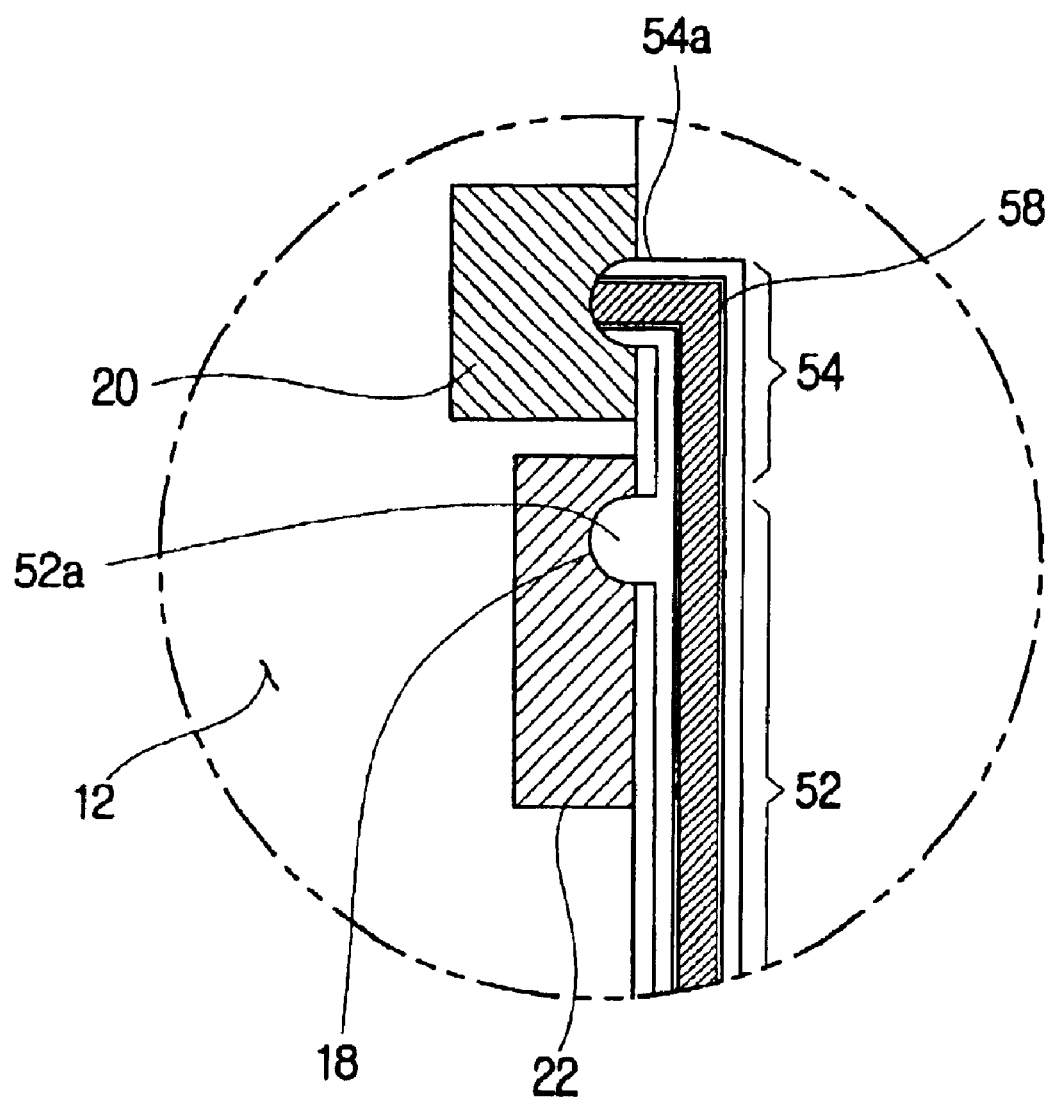
FIG. 2 is an enlarged sectional view illustrating where the wireless LAN card of FIG. 1 is connected to a guiding part.

As illustrated in FIG. 2, each RF signal line 58 is embedded inside the latch member 52 and an antenna connecting part 54, but exposed externally at protruding part 54a of the antenna connecting part 54, thereby electrically connecting the RF signal line 58 to specific circuits.

On the other hand, the wireless LAN card 10 comprises a main card 12 made of a PCB substrate including a signal processing part 14, and at the front side of the main card 12 is provided a connector 16 to provide data communication between the signal processing part 14 and a computer system when the wireless LAN card 10 is mounted on the PCI slot part 50.

At opposite sides of the main card 12 are provided latch grooves 18 on which ground contacting parts 52a of the latch members 52 are latched. In the main card 12 are provided ground patterns 22 adjacent to the ground contacting parts 52a of the latch members 52 to ground the main card 12 when the ground contacting parts 52a of the latch members 52 are latched on the latch grooves 18. An RF connector 20 is provided adjacent to the protruding part 54a of each antenna connecting part 54 so as to electrically connect the RF signal line 58, exposed to the outside at the protruding part 54a, with the main card 12.

With this configuration, when the connector 16 of the wireless LAN card 10 is completely inserted into the PCI slot part 50, the latch members 52 are elastically deformed outward, the ground contacting parts 52a of the latch members 52 are latched on the latch grooves 18 of the wireless LAN card 10, and simultaneously the RF signal lines 58 exposed externally at the protruding parts 54a of the antenna connecting parts 54 are electrically connected to the RF connectors 20 of the wireless LAN card 10. Therefore, a signal inputted from the antenna parts 30 can be transmitted to the signal processing part 14 of the wireless LAN card 10 through the antenna connecting parts 54 and the RF connectors 20, and a signal from the PCI slot part 50 can also be transmitted to the antenna parts 30 through the antenna connecting parts 54 and the RF connectors 20.

Herein, the surface of each latch member 52 is shielded by a conductive material. Therefore, when the ground contacting parts 52a thereof are latched on the latch groove 18 of the main card 12 as the wireless LAN card 10 is slidingly inserted into the PCI slot part 50, the shielded surface of the latch member 52 is in contact with the ground pattern 22 adjacent to the latch groove 18, thereby grounding the wireless LAN card 10.

As described above, according to the present invention, an RF signal line is embedded inside a latch member provided in a PCI slot part to connect the PCI slot part and the wireless LAN card, and also embedded inside an antenna connecting part, so that an RF connector of the wireless LAN card is in contact with the RF signal line exposed externally at the antenna connecting part. Thus, by simply installing the wireless LAN card in the PCI slot part, the wireless LAN card is electrically connected to an antenna part, while grounding the wireless LAN card.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A portable computer comprising:
    a main board;
    at least one antenna to receive and transmit an RF signal;
    a PCI slot part mountable on said main board to receive said RF signal received and transmitted through said at least one antenna;
    a wireless LAN card including a main card removably inserted into said PCI slot part, and at least one RF connector provided at a side of said main card and through which the RF signal is inputted/outputted between said at least one antenna and said PCI slot part; and
    at least one antenna connecting part connectable to said at least one RF connector to allow the RF signal to be inputted/outputted through said at least one RF connector between said at least one antenna and said PCI slot part when said wireless LAN card is inserted into said PCI slot part.

2. The portable computer according to claim 1, further comprising:
    a pair of latch members provided at opposite sides of said PCI slot part, guiding said wireless LAN card to be slidingly inserted into said PCI slot part, each said latch member connected to a respective said at least one antenna connecting part; and
    an RF signal line embedded inside each said at least one antenna connecting part and each said latch member, and connecting each said antenna connecting part to each said RF connector of said wireless LAN card.

3. The portable computer according to claim 2, wherein each said antenna connecting part and each said latch member comprise a protruding part thereon to latch onto said wireless LAN card, respectively, and said wireless LAN card having latch grooves corresponding to each of said protruding parts.

4. The portable computer according to claim 3, wherein each said RF signal line is exposed externally at the protruding part of each said respective antenna connecting part, and electrically connected to each said respective RF connector.

5. The portable computer according to claim 3, wherein said wireless LAN card includes ground parts positioned at opposite sides of said main card, and said latch members include ground contacting parts to connect to said ground parts.

6. The portable computer according to claim 4, wherein said wireless LAN card includes ground parts positioned at opposite sides of said main card, and said latch members include ground contacting parts to connect to said ground parts.

7. A portable computer comprising:
    a wireless LAN card having connected on each of two opposing sides thereof an RF connector and a ground pattern;
    at least one antenna part; and
    a PCI slot part removably connected to said wireless LAN card and having a pair of latch members with protruding parts extending therefrom to latch with said RF connectors and ground patterns, respectively, each said latch member having an RF signal line embedded therein, each said RF signal line connected to one antenna part at a first end and exposed externally from the protruding part of said latch members at a second end to electrically connect with said RF connectors to provide RF signals received and transmitted through said antenna parts to said RF connectors.

8. A portable computer comprising:
    a wireless LAN card having connected on each of two opposing sides thereof an RF connector;
    antenna parts; and
    a PCI slot part removably connected to said wireless LAN card and having a pair of latch members extending therefrom to latch with each of said RF connectors, respectively, each said latch member having an RF signal line embedded therein, each said RF signal line connected to a respective said antenna part at a first end and exposed externally from said latch member at a second end to electrically connect with said respective RF connector to provide an RF signal received and transmitted through said respective antenna part to said RF connector.

9. The portable computer according to claim 8, wherein:
    each RF connector has a groove therein; and
    each said latch member has a protruding part extending therefrom to latch with a respective said RF connector groove.

10. The portable computer according to claim 8, wherein said wireless LAN card includes ground parts positioned at opposite sides thereof to connect with a respective said latch member to provide a ground thereto.

\* \* \* \* \*

UNITED STATES PATENT AND TRADEMARK OFFICE
CERTIFICATE OF CORRECTION

| | | |
|---|---|---|
| PATENT NO. | : 6,985,354 B2 | Page 1 of 1 |
| APPLICATION NO. | : 10/159130 | |
| DATED | : January 10, 2006 | |
| INVENTOR(S) | : Chee-hwan Yang et al. | |

It is certified that error appears in the above-identified patent and that said Letters Patent is hereby corrected as shown below:

On the TITLE Page, Column 2, line 1, (Attorney Agent or Firm), replace "Stass" with --Staas--, therefor.

Signed and Sealed this

Eighth Day of August, 2006

JON W. DUDAS
*Director of the United States Patent and Trademark Office*